(12) United States Patent
Shen et al.

(10) Patent No.: US 12,167,388 B2
(45) Date of Patent: Dec. 10, 2024

(54) RESOURCE MAPPING METHOD AND USER EQUIPMENT

(71) Applicant: VIVO MOBILE COMMUNICATION CO., LTD., Guangdong (CN)

(72) Inventors: Xiaodong Shen, Guangdong (CN); Na Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 447 days.

(21) Appl. No.: 17/537,659

(22) Filed: Nov. 30, 2021

(65) Prior Publication Data

US 2022/0086877 A1  Mar. 17, 2022

Related U.S. Application Data

(63) Continuation of application No. PCT/CN2020/092637, filed on May 27, 2020.

(30) Foreign Application Priority Data

May 30, 2019  (CN) .......................... 201910465673.7

(51) Int. Cl.
*H04W 72/12* (2023.01)
*H04L 5/00* (2006.01)
(Continued)

(52) U.S. Cl.
CPC ....... *H04W 72/1268* (2013.01); *H04L 5/0005* (2013.01); *H04W 72/044* (2013.01)

(58) Field of Classification Search
CPC ........... H04W 72/1268; H04W 72/044; H04W 72/23; H04W 72/0446; H04W 72/20; H04L 5/0005; H04L 5/0044; H04L 5/0091

See application file for complete search history.

(56) References Cited

U.S. PATENT DOCUMENTS

2011/0090863 A1  4/2011  Hao et al.
2015/0036560 A1  2/2015  Kim et al.
(Continued)

FOREIGN PATENT DOCUMENTS

CN  101267679 A  9/2008
CN  107734520 A  2/2018
(Continued)

OTHER PUBLICATIONS

Vivo, "Discussion on the enhancements to configured grants", 3GPP TSG RAN WG1 #97, R1-1906133, Reno, USA, May 13-17, 2019 (Year: 2019).*

(Continued)

*Primary Examiner* — Lan-Huong Truong
(74) *Attorney, Agent, or Firm* — Price Heneveld LLP

(57) ABSTRACT

A resource mapping method and user equipment are provided. The method includes: mapping a target channel to a first time domain resource based on configuration information, where the target channel carries first data, and the configuration information includes a first numerical value; and the first numerical value is used to indicate the number of channels to be mapped to a target time domain resource in each period, or the number of usable first time domain units in each period; the target time domain resource is a resource configured for the first data; and the first time domain resource is a resource in the target time domain resource.

13 Claims, 11 Drawing Sheets

(51) Int. Cl.
*H04W 72/044* (2023.01)
*H04W 72/1268* (2023.01)

(56) References Cited

U.S. PATENT DOCUMENTS

| | | |
|---|---|---|
| 2019/0037540 A1 | 1/2019 | Seo et al. |
| 2019/0173715 A1 | 6/2019 | Li et al. |
| 2019/0182811 A1 | 6/2019 | Xu |
| 2019/0349178 A1 | 11/2019 | Jia et al. |
| 2020/0037348 A1* | 1/2020 | Nam ................... H04W 72/20 |
| 2020/0164805 A1* | 5/2020 | Fimeri ................... F16D 11/14 |
| 2023/0364557 A1* | 11/2023 | Hoyda ................... B01D 53/84 |

FOREIGN PATENT DOCUMENTS

| | | |
|---|---|---|
| CN | 107770870 A | 3/2018 |
| CN | 108366424 A | 8/2018 |
| CN | 109803411 A | 5/2019 |
| WO | 2014003278 A1 | 1/2014 |
| WO | 2018232321 A2 | 12/2018 |

OTHER PUBLICATIONS

Intel Corporation, "Enhancements to configured grants for NR-unlicensed", 3GPP TSG RAN WG1 Meeting #97, R1-1906788, Reno, Nevada, USA, May 13-17, 2019.

Vivo, "Discussion on the enhancements to configured grants", 3GPP TSG RAN WG1 #97, R1-1906133, Reno, USA, May 13-17, 2019.

Huawei, "Transmission with configured grant in NR unlicensed band", 3GPP TSG RAN WGI Meeting #97, RI-1906047, Reno, USA, May 13-17, 2019.

Huawei, "Draft CR on resource allocation", 3GPP TSG RAN WG1 Meeting #92bis, R1-1804307, Sanya, China, Apr. 16-20, 2018.

* cited by examiner

RESOURCE MAPPING METHOD AND USER EQUIPMENT

CROSS-REFERENCE TO RELATED APPLICATIONS

This application is a continuation application of PCT International Application No. PCT/CN2020/092637 filed on May 27, 2020, which claims priority to Chinese Patent Application No. 201910465673.7, filed with the China National Intellectual Property Administration on May 30, 2019 and entitled "RESOURCE MAPPING METHOD AND USER EQUIPMENT", the disclosures of which are incorporated herein by reference in their entireties.

TECHNICAL FIELD

Embodiments of this disclosure relate to the field of communications technologies, and in particular, to a resource mapping method and user equipment (UE).

BACKGROUND

With rapid development of communications technologies, unlicensed bands serve as a supplement to licensed bands to improve spectrum utilization.

Currently, in a new radio (NR) system, bitmaps based on autonomous uplink access (AUL) in further enhanced licensed assisted access (FeLAA) can be used as an enhancement scheme for configuring time domain resources for autonomous uplink transmission (configured grant) in the unlicensed bands. Specifically, in a bitmap for autonomous uplink access, one bit may represent one subframe or one time interval. When one bit represents one subframe, one bitmap may include 40 bits, which, however, generally requires that a period for bitmap configuration (which means a use period of time domain resources) be divisible by 40 to allow periodical configuration, leading to less flexible periods for bitmap configuration. When one bit represents one time interval, if different subcarrier spacings correspond to a same bitmap configuration period, the number of bits corresponding to each frequency band is fixed in the same period, leading to less flexible quantities of bits in a bitmap. As a result, configuration of time domain resources is not flexible.

SUMMARY

Embodiments of this disclosure provide a resource mapping method and user equipment.

According to a first aspect, an embodiment of this disclosure provides a resource mapping method. The method may be applied to UE. The method may include: mapping a target channel to a first time domain resource based on configuration information, where the target channel carries first data, and the configuration information includes a first numerical value; and the first numerical value is used to indicate the number of channels to be mapped to a target time domain resource in each period, or the number of usable first time domain units in each period; the target time domain resource is a resource configured for the first data; and the first time domain resource is a resource in the target time domain resource.

According to a second aspect, an embodiment of this disclosure further provides UE. The UE includes a processing module. The processing module is configured to map a target channel to a first time domain resource based on configuration information, where the target channel carries first data, and the configuration information includes a first numerical value; and the first numerical value is used to indicate the number of channels to be mapped to a target time domain resource in each period, or the number of usable first time domain units in each period; the target time domain resource is a resource configured for the first data; and the first time domain resource is a resource in the target time domain resource.

According to a third aspect, an embodiment of this disclosure provides UE, including a processor, a memory, and a computer program stored in the memory and running on the processor. When the computer program is executed by the processor, the steps of the resource mapping method according to the first aspect are implemented.

According to a fourth aspect, an embodiment of this disclosure provides a computer-readable storage medium. A computer program is stored in the computer-readable storage medium. When the computer program is executed by a processor, the steps of the resource mapping method according to the first aspect are implemented.

DESCRIPTION OF EMBODIMENTS

Figure 1:
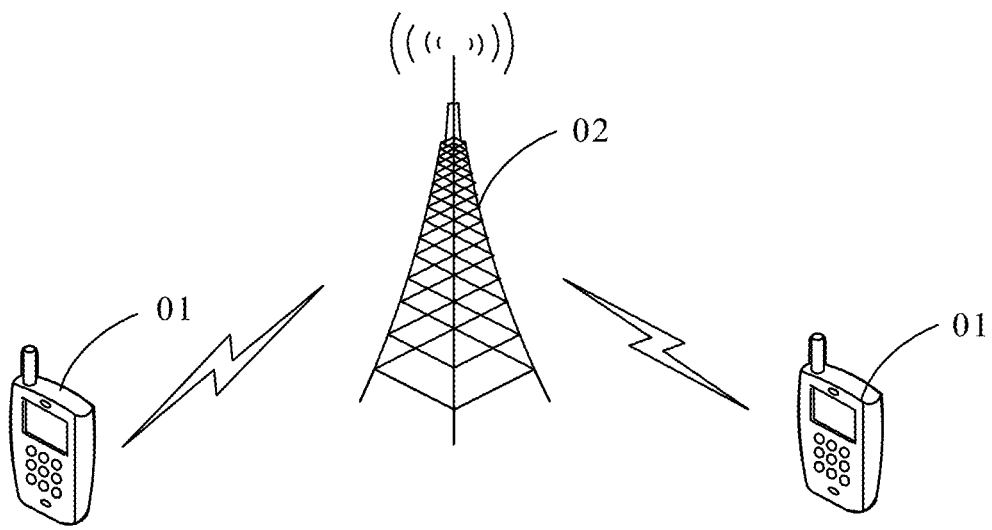
FIG. 1 is a schematic architectural diagram of a communications system according to an embodiment of this disclosure.

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The term "and/or" in this specification describes an association relationship for describing associated objects and represents that three relationships may exist. For example, A and/or B may represent the following three cases: A alone, both A and B, and B alone. The symbol "/" in this specification indicates the relationship that the associated objects are in an "or" relationship, for example, A/B means A or B.

In this specification and claims of this disclosure, the terms such as "first" and "second" are intended to distinguish between similar objects, but not to necessarily describe a specific order of the objects. For example, a first time domain unit, a second time domain unit, and the like are used to distinguish between different time domain units, instead of describing a specific order of the time domain units.

In the embodiments of this disclosure, terms such as "an example" or "for example" are used to represent examples, illustrations, or explanations. Any embodiment or design solution described as "an example" or "for example" in the embodiments of this disclosure should not be construed as advantageous over other embodiments or design solutions. To be precise, the words such as "an example" or "for example" are intended to present a related concept in a specific manner.

In the description of the embodiments of this disclosure, unless otherwise specified, a "plurality" means two or more than two. For example, a plurality of components indicates two or more than two components.

An embodiment of this disclosure provides a resource mapping method and user equipment. A target channel can be mapped to a first time domain resource based on configuration information, where the target channel carries first data, and the configuration information includes a first numerical value; and the first numerical value is used to indicate the number of channels to be mapped to a target time domain resource in each period, or the number of usable first time domain units in each period; the target time domain resource is a resource configured for the first data; and the first time domain resource is a resource in the target time domain resource. In this solution, the first numerical value in the configuration information may be used to indicate the number of channels to be mapped in each period or the number of usable first time domain units in each period. Therefore, the number of channels to be mapped in each period or the number of usable first time domain units in each period can be flexibly configured by configuring the first numerical value, so as to flexibly configure, based on the configuration information, the first time domain resource for mapping the target channel in the embodiments of this disclosure, thereby improving flexibility in configuration of time domain resources.

The resource mapping method and the user equipment provided in the embodiments of this disclosure may be applied to a communications system, and may be specifically applied to a scenario of configuring time domain resources based on configured grant transmission.

As shown in FIG. 1, FIG. 1 is a schematic architectural diagram of a communications system according to an embodiment of this disclosure. The communications system may include UE 01 and an access network device 02. A connection may be established between the UE 01 and the access network device 02.

It should be noted that in the embodiments of this disclosure, the UE 01 and the access network device 02 shown in FIG. 1 may be wirelessly connected.

The UE is a device that provides a user with voice and/or data connectivity, a handheld device with a wired/wireless connection function, or another processing device connected to a wireless modem. The UE may communicate with one or more core network devices through a radio access network (RAN). The UE may be a mobile terminal such as a mobile phone (or referred to as a "cellular" phone) and a computer having a mobile terminal, such as a portable, pocket-sized, handheld, computer built-in, or in-vehicle mobile apparatus, which exchanges voice and/or data with the RAN; or may be a device such as a personal communication service (PCS) phone, a cordless phone, a session initiation protocol (SIP) phone, a wireless local loop (WLL) station, or a personal digital assistant (PDA). The UE may alternatively be referred to as a user agent, a terminal device, or the like.

The access network device is a device deployed in the RAN and configured to provide a wireless communication function for the UE. In this embodiment of this disclosure, the access network device may be a base station, and the base station may include various forms, such as a macro base station, a micro base station, a relay station, and an access point. Names of devices having functions of the base station may vary in systems using different radio access technologies. For example, the base station may be referred to as a 5G base station (gNB) in a fifth generation mobile communications (5-Generation, 5G) system, may be referred to as an evolved base station (evolved NodeB, eNB) in a fourth-generation wireless communications (4-Generation, 4G) system, such as a long-term evolution (long Term Evolution, LTE) system, or may be referred to as a base station (Node B) in a third-generation mobile communications (3-Generation, 3G) system. With evolution of the communications technologies, the name "base station" may change.

The following describes in detail a resource mapping method and user equipment provided in the embodiments of this disclosure by using specific embodiments and application scenarios thereof with reference to the accompanying drawings.

Figure 2:
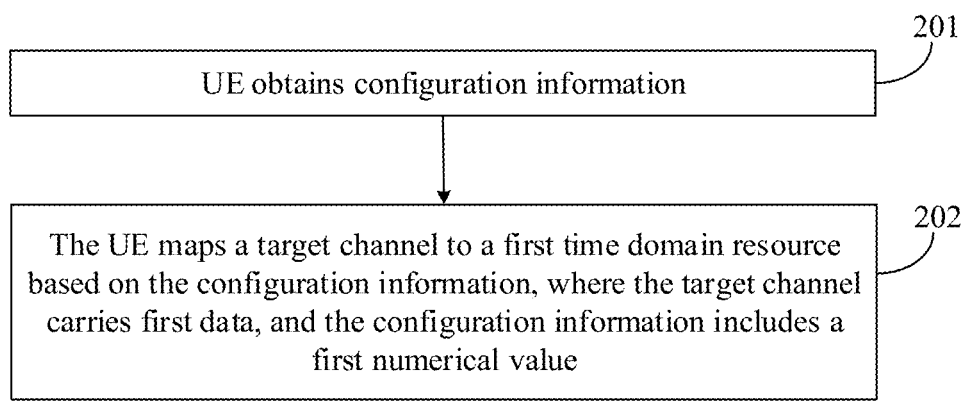
FIG. 2 is a first schematic diagram of a resource mapping method according to an embodiment of this disclosure.

Based on the communications system shown in FIG. 1, an embodiment of this disclosure provides a resource mapping method. As shown in FIG. 2, the method may be applied to user equipment UE, and the method includes the following steps 201 and 202.

Step 201: The UE obtains configuration information.

Optionally, the configuration information may be configured by a network-side device, predefined in a communication protocol, or configured for the UE. This may be specifically determined based on an actual use requirement, and is not limited in the embodiments of this disclosure.

Optionally, in a case that the configuration information is configured by a network device, the foregoing step 201 may be specifically: the UE receives configuration information transmitted by an access network device.

Figure 3:
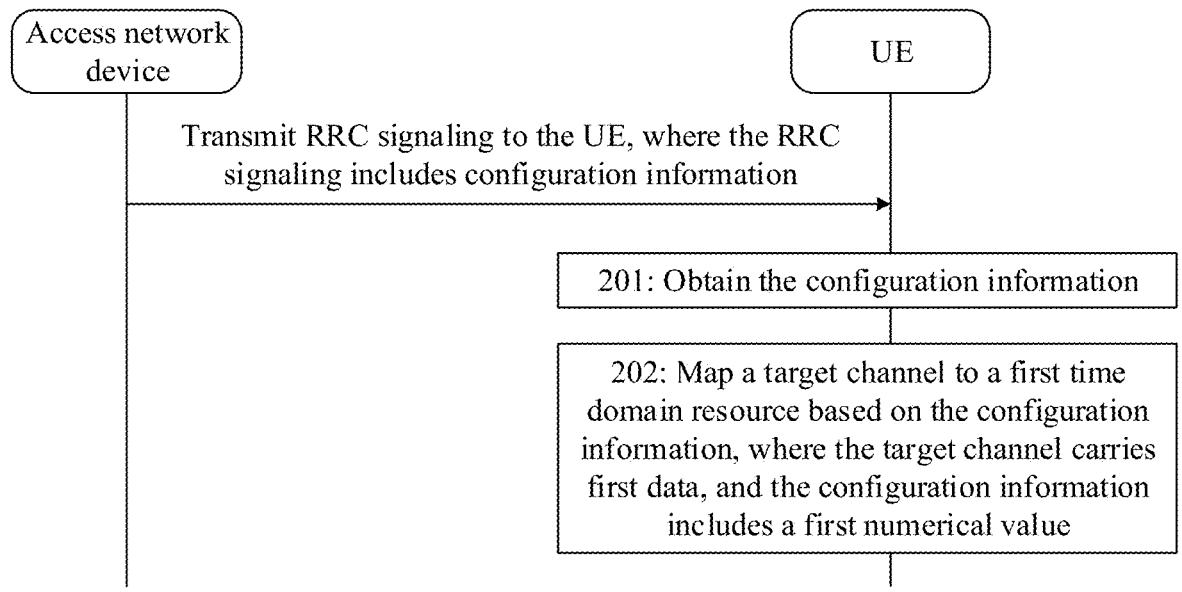
FIG. 3 is a second schematic diagram of a resource mapping method according to an embodiment of this disclosure.

For example, as shown in FIG. 3, after the access network device configures the configuration information, the access network device may transmit radio resource control (RRC) signaling to the UE, where the RRC signaling may include the configuration information. In this way, the UE receives the RRC signaling and obtains the configuration information from the RRC signaling.

It should be noted that the foregoing example in which the access network device transmits, to the UE, the RRC signaling including the configuration information is used for exemplary description, and does not constitute any limitation on the embodiments of this disclosure. It can be understood that in actual implementation, the access network device may transmit other types of signaling or resources to the UE, and the other types of signaling or resources may include the configuration information. This may be specifically determined based on an actual use requirement.

Step 202: The UE maps a target channel to a first time domain resource based on the configuration information, where the target channel carries first data, and the configuration information includes a first numerical value.

The first numerical value may be used to indicate the number of channels to be mapped in each period (period, or referred to as configuration period) in the target time domain resource, or the number of usable first time domain units in each period (configuration period). The target time domain resource may be a resource configured for the first data. The first time domain resource may be a resource in the target time domain resource.

Optionally, the configuration information may further include a period length, a first start position, and a first quantity.

The period length may be a length of each period (the configuration period) in the target time domain resource.

The first start position may be a start position for mapping the 1st channel in the target time domain resource in the 1st period (the 1st configuration period).

The first quantity may be the number of second time domain units occupied by one channel in the target time domain resource in each period (configuration period).

It should be noted that the first start position and the first quantity may be collectively referred to as a time domain resource configuration (SLIV).

Optionally, in this embodiment of this disclosure, the target time domain resource may be a time domain resource of an unlicensed spectrum, or a time domain resource of a licensed spectrum. This may be specifically determined based on an actual use requirement, and is not limited in the embodiments of this disclosure.

Optionally, in this embodiment of this disclosure, the target channel may include one or more channels.

Optionally, in this embodiment of this disclosure, the target channel may be an uplink channel, such as a physical uplink shared channel (PUSCH). Certainly, the target channel may alternatively be other possible channels. This may be specifically determined based on an actual use requirement, and is not limited in the embodiments of this disclosure.

Optionally, in this embodiment of this disclosure, in a case that the target channel includes a plurality of PUSCHs, each PUSCH may be specifically a PUSCH resource block.

Optionally, in this embodiment of this disclosure, one second time domain unit may be one symbol.

Optionally, in this embodiment of this disclosure, one usable first time domain unit may be one slot.

Optionally, in this embodiment of this disclosure, a length of one usable first time domain unit may be greater than a length of one second time domain unit. For example, the length of one usable first time domain unit may be one slot, and the one slot includes 4, 7, or 14 symbols. The length of one second time domain unit is one symbol.

It should be noted that in FIG. 4 to FIG. 15 in the embodiments of this disclosure, the length of one usable first time domain unit being 14 symbols is used as an example for exemplary description. It can be understood that this is not limited in the embodiments of this disclosure.

Optionally, in this embodiment of this disclosure, the configuration information may further include a first offset, and the first offset may be an offset of the target time domain resource. It can be understood that the first offset is configured, so that the UE can determine a start position (starting time) of the target time domain resource.

Optionally, in this embodiment of this disclosure, the configuration information may further include a second quantity. The second quantity may be the number of periods in the target time domain resource, and the second quantity may be a positive integer. It can be understood that the second quantity is configured, so that the UE can determine the number of periodicity for retransmission times.

Optionally, in this embodiment of this disclosure, the first numerical value may be an integer greater than or equal to 0, and the first numerical value may be less than or equal to a second numerical value. The second numerical value may be the number of usable first time domain units included in each period.

Optionally, in this embodiment of this disclosure, the first numerical value may be an invalid numerical value or a valid numerical value. The invalid numerical value may be 0 or +∞, and the valid numerical value may be 1, 2, 3, 4, or other possible positive integers.

Optionally, in a case that the first numerical value is an invalid numerical value, the number of channels to be mapped in each period may be 1.

Specifically, in a case that the first numerical value is an invalid numerical value and the length of the usable first time domain units is greater than the period length, the number of channels to be mapped in each period is 1. In a case that the first numerical value is an invalid numerical value and the length of the usable first time domain units is less than or equal to the period length, the number of channels to be mapped in each period is 1.

For example, it is assumed that the first numerical value is 0, the length of the usable first time domain units is 14 symbols, and the period length is 7 symbols. Because the first numerical value is an invalid numerical value, the number of channels to be mapped in each period is 1.

For example, it is assumed that the first numerical value is 0, the length of the usable first time domain units is 7 symbols, and the period length is 14 symbols. Because the first numerical value is an invalid numerical value, the number of channels to be mapped in each period is 1.

Optionally, in a case that the first numerical value is a valid numerical value, the number of channels to be mapped in each period or the number of usable first time domain units in each period may be the first numerical value.

Specifically, in a case that the first numerical value is a valid numerical value and the length of the usable first time domain units is greater than the period length, the number of channels to be mapped in each period is the first numerical value. In a case that the first numerical value is a valid numerical value and the length of the usable first time domain units is less than or equal to the period length, the number of usable first time domain units in each period is the first numerical value.

For example, it is assumed that the first numerical value is 2, the length of the usable first time domain units is 14 symbols, and the period length is 7 symbols. Because the first numerical value is a valid numerical value and the length of the usable first time domain units is greater than the period length, the number of channels to be mapped in each period may be 2.

For example, it is assumed that the first numerical value is 2, the length of the usable first time domain units is 7 symbols, and the period length is 14 symbols. Because the first numerical value is a valid numerical value and the length of the usable first time domain units is less than the period length, the number of usable first time domain units in each period is 2.

This embodiment of this disclosure provides a resource mapping method. Because the first numerical value in the configuration information may be used to indicate the number of channels to be mapped in each period or the number of usable first time domain units in each period. Therefore, the number of channels to be mapped in each period or the number of usable first time domain units in each period can be flexibly configured by configuring the first numerical value, so as to flexibly configure, based on the configuration information, the first time domain resource for mapping the target channel in the embodiments of this disclosure, thereby improving flexibility in configuration of time domain resources.

Optionally, in this embodiment of this disclosure, the foregoing step 202 may be specifically implemented by the following step 202A.

Step 202A: In each period, the UE maps the target channel to the first time domain resource based on the configuration information.

In this embodiment of this disclosure, after the start position of the target time domain resource is determined based on the first offset, the UE may determine the first time domain resource in each period, and map the target channel to the first time domain resource in each period.

Specifically, the foregoing step 202A may be implemented by any one of the following (1) to (3):

(1) In a case that the first numerical value is an invalid numerical value, the number of channels to be mapped in each period is 1. Correspondingly, the foregoing step 202A may be specifically implemented by the following steps 202A1 and 202A2.

Step 202A1: In each period, the UE determines the first time domain resource based on the configuration information.

Step 202A2: The UE maps the target channel to the first time domain resource.

The first time domain resource may be L consecutive second time domain units from the first start position. L is the first quantity, and L is a positive integer.

It should be noted that for details about the foregoing steps 202A1 and 202A2, reference may be made to the description related to configuration of time domain resources in NR release 5. Details are not described herein.

For example, in the case that the first numerical value is an invalid numerical value (for example, N=0), assuming that the first start position is denoted by S and the first quantity is denoted by L, a start time for mapping one channel in each period may be [S, S+L−1].

Figure 4:
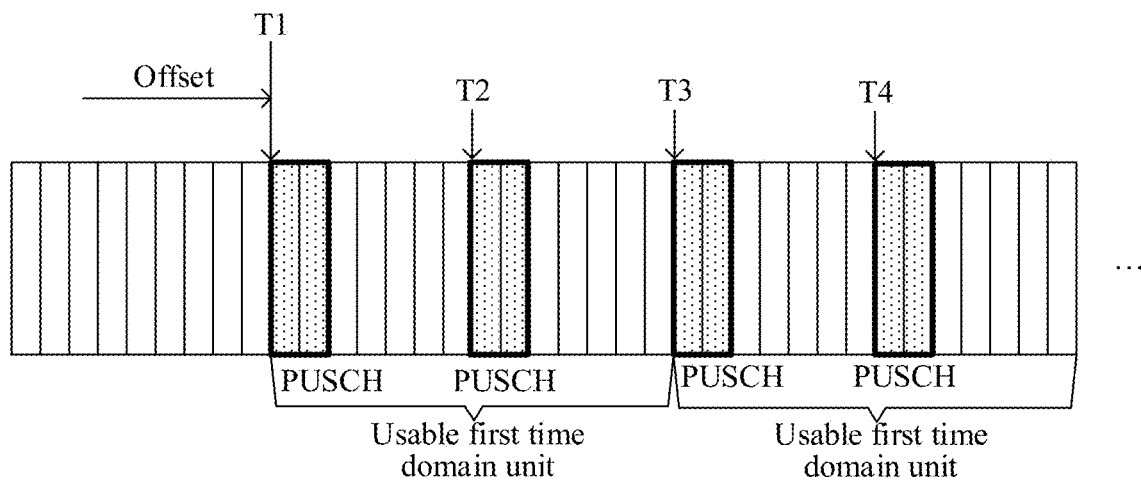
FIG. 4 is a first schematic diagram of mapping a channel to a time domain resource according to an embodiment of this disclosure.

As shown in FIG. 4, an example in which the first numerical value N is 0, the period length X is 7, the first start position S is 0, and the first quantity L is 2 is used for exemplary description. Because the first numerical value N being 0 is an invalid numerical value, the number of channels to be mapped in each period may be 1. In addition, because the first start position S is 0, the start position in each period is the start position for mapping one channel in each period. Two consecutive second time domain units starting from a start position T1 of the 1st period are a first time domain resource in the 1st period; two consecutive second time domain units starting from a start position T2 of the 2nd period are a first time domain resource in the 2nd period; two consecutive second time domain units starting from a start position T3 of the 3rd period are a first time domain resource in the 3rd period; two consecutive second time domain units starting from a start position T4 of the 4th period are a first time domain resource in the 4th period; . . . ; and so on. In this way, one PUSCH may be mapped to the first time domain resource in each period.

According to the resource mapping method provided in this embodiment of this disclosure, in the case that the first numerical value is an invalid numerical value, the number of channels to be mapped in each period may be configured to 1, so that one channel may be mapped in each period.

(2) In a case that the first numerical value is a valid numerical value and the length of the usable first time domain units is greater than the period length, the number of channels to be mapped in each period is the first numerical value. Correspondingly, the foregoing step 202A may be specifically implemented by the following steps 202A3 and 202A4.

Step 202A3: In each period, the UE determines the first time domain resource based on the configuration information.

Step 202A4: The UE maps the target channel to the first time domain resource.

The first time domain resource may be N consecutive first mapping sub-resources from the first start position. The number of second time domain units in each of the N first mapping sub-resources is the first quantity, and N is the first numerical value.

Optionally, the target channel may include a plurality of subchannels, and each subchannel may be mapped to at least one first mapping sub-resource.

For example, in a case that the first numerical value is a valid numerical value and the length of the usable first time domain units is greater than the period length, assuming that the first numerical value is denoted by N, the first start position is denoted by S, and the first quantity is denoted by L, a start time for mapping at least one channel in each period may be [S,S+L−1], [S+L,S+2L−1], . . . , [S+(N−1)*L,S+N*L−1].

N≤floor{X/L}, where floor{ } is a function obtained by rounding down.

Figure 5:
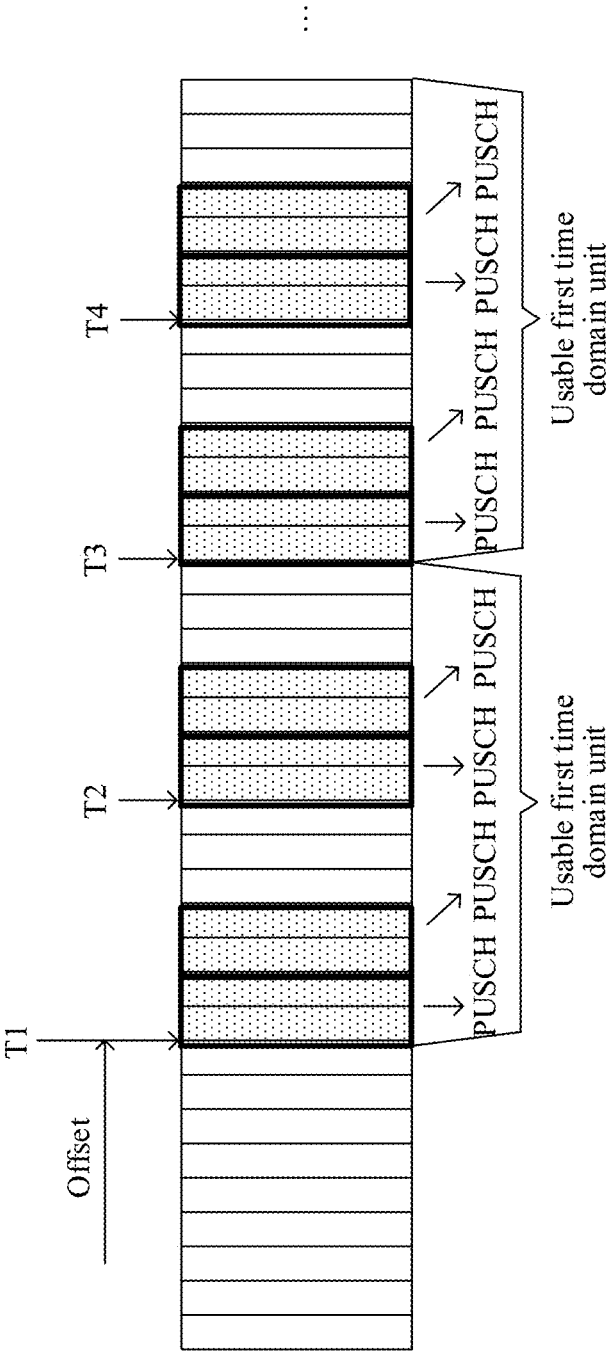
FIG. 5 is a second schematic diagram of mapping a channel to a time domain resource according to an embodiment of this disclosure.

As shown in FIG. 5, an example in which the first numerical value N is 2, the period length X is 7, the first start position S is 0, and the first quantity L is 2 is used for exemplary description. Because the first numerical value N being 2 is a valid numerical value, the number of channels to be mapped in each period is 2. In addition, because the first start position S is 0, the start position in each period is the start position for mapping the 1st channel in each period. Two consecutive second time domain units starting from a start position T1 of the 1st period are the 1st first mapping sub-resource in the 1st period, and two consecutive second time domain units starting from the 1st first mapping sub-resource in the 1st period are the 2nd first mapping sub-resource in the 1st period; two consecutive second time domain units starting from a start position T2 of the 2nd period are the 1st first mapping sub-resource in the 2nd period, and two consecutive second time domain units starting from the 1st first mapping sub-resource in the 2nd period are the 2nd first mapping sub-resource in the 2nd period; two consecutive second time domain units starting from a start position T3 of the 3rd period are the 1st first mapping sub-resource in the 3rd period, and two consecutive second time domain units starting from the 1st first mapping sub-resource in the 3rd period are the 2nd first mapping sub-resource in the 3rd period; two consecutive second time domain units starting from a start position T4 of the 4th period are the 1st first mapping sub-resource in the 4th period, and two consecutive second time domain units starting from the 1st first mapping sub-resource in the 4th period are the 2nd first mapping sub-resource in the 4th period; . . . ; and so on. In this way, after the UE determines two first mapping sub-resources in each period, one PUSCH may be mapped to each first mapping sub-resource in each period.

According to the resource mapping method provided in this embodiment of this disclosure, in the case that the first numerical value is a valid numerical value and the length of the usable first time domain units is greater than the period length, the number of channels to be mapped in each period may be configured to the first numerical value, and therefore channels of a quantity equal to the first numerical value can be mapped in each period.

(3) In a case that the first numerical value is a valid numerical value and the length of the usable first time domain units is less than or equal to the period length, the number of usable first time domain units in each period may be the first numerical value. Correspondingly, the foregoing step 202A may be specifically implemented by the following steps 202A5, 202A6, and 202A7.

Step 202A5: In each period, the UE determines M usable first time domain units based on the configuration information.

M is the first numerical value, and M is a positive integer.

For example, if the first numerical value is a valid numerical value 3, the number of usable first time domain units in each period is 3; if the first numerical value is a valid numerical value 4, the number of usable first time domain units in each period is 4; or if the first numerical value is a valid numerical value 5, the number of usable first time domain units in each period is 5.

Step 202A6: The UE determines the first time domain resource from the M usable first time domain units.

Optionally, the first time domain resource may be part or all of resources in the M usable first time domain units.

Optionally, the foregoing step 202A6 may specifically include: the UE determines the first time domain resource from the M usable first time domain units based on the configuration information by using a target manner. The target manner may be a first manner, a second manner, or a third manner.

Optionally, in this embodiment of this disclosure, the first manner may be that a mapping resource of each usable first time domain unit in the M usable first time domain units is a first target resource.

Optionally, in this embodiment of this disclosure, the second manner may be that a mapping resource of the 1st usable first time domain unit in the M usable first time domain units is a first target resource, and mapping resources of other usable first time domain units in the M usable first time domain units are second target resources.

Optionally, in this embodiment of this disclosure, the third manner may be that a mapping resource of the 1st usable first time domain unit in the M usable first time domain units is a first target resource, a mapping resource of the last usable first time domain unit in the M usable first time domain units is a third target resource, and mapping resources of other usable first time domain units in the M usable first time domain units are second target resources.

It should be noted that in any one of the foregoing three manners, a mapping resource of each usable first time domain unit may form the first time domain resource.

Optionally, the first target resource may be a first resource, a second resource, or a third resource.

Optionally, the second target resource may be a fourth resource or a fifth resource.

Optionally, the third target resource may be a sixth resource.

(a) The first resource may be K consecutive second mapping sub-resources starting from the first start position. The number of second time domain units in each second mapping sub-resource may be the first quantity, and K may be a value obtained by rounding down a ratio of a first difference to the first quantity. The first difference may be a different between the length of the usable first time domain units and the first start position, and K is a positive integer.

For example, in a case that the first numerical value is a valid numerical value and the length of the usable first time domain units is less than or equal to the period length, assuming that the first start position is denoted by S, the first quantity is denoted by L, the number of second mapping sub-resources is denoted by K, a start time for mapping at least one channel to the usable first time domain unit may be [S,S+L−1], [S+L,S+2L−1], . . . , [S+(K−1)*L,S+K*L−1].

K=floor{(F−S)/L}, where floor{ } is a function obtained by rounding down.

Figure 6:
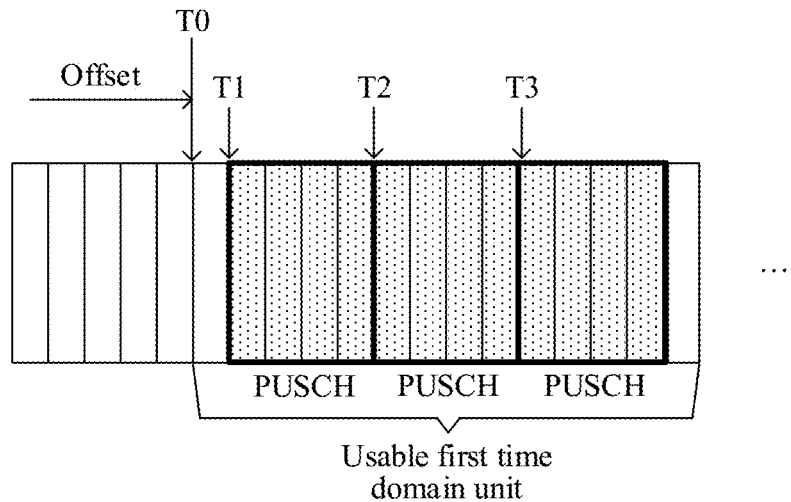
FIG. 6 is a third schematic diagram of mapping a channel to a time domain resource according to an embodiment of this disclosure.

As shown in FIG. 6, an example in which the start position of the usable first time domain units is T0, the length of the usable first time domain units F is 14, the first start position S is 1, and the first quantity L is 4 is used for exemplary description. The number of second mapping sub-resources may be:

$K=\text{floor}\{(F-S)/L\}=\text{floor}\{(14-1)/4\}=3.$

Because the first start position S is 1, the position T1 of the usable first time domain unit may be a start position for mapping the 1st channel. Four consecutive second time domain units starting from the position T1 of the usable first time domain unit may be the 1st second mapping sub-resource of the usable first time domain unit, and the 1st second mapping sub-resource may be used for mapping the 1st PUSCH. Four consecutive second time domain units starting from the position T2 of the usable first time domain unit may be the 2nd second mapping sub-resource of the usable first time domain unit, and the 2nd second mapping sub-resource may be used for mapping the 2nd PUSCH. Four consecutive second time domain units starting from the position T3 of the usable first time domain unit may be the 3rd second mapping sub-resource of the usable first time domain unit, and the 3rd second mapping sub-resource may be used for mapping the 3rd PUSCH.

(b) The second resource may be K consecutive second mapping sub-resources starting from the first start position and one third mapping sub-resource. The third mapping sub-resource may be a second time domain unit, other than second time domain unit(s) before the first start position and second time domain unit(s) of the K second mapping sub-resources, in the usable first time domain units.

It can be understood that the third mapping sub-resource includes the last second time domain unit in the usable first time domain unit.

In this embodiment of this disclosure, the length of the third mapping sub-resource may be less than the length of one second mapping sub-resource.

Figure 7:
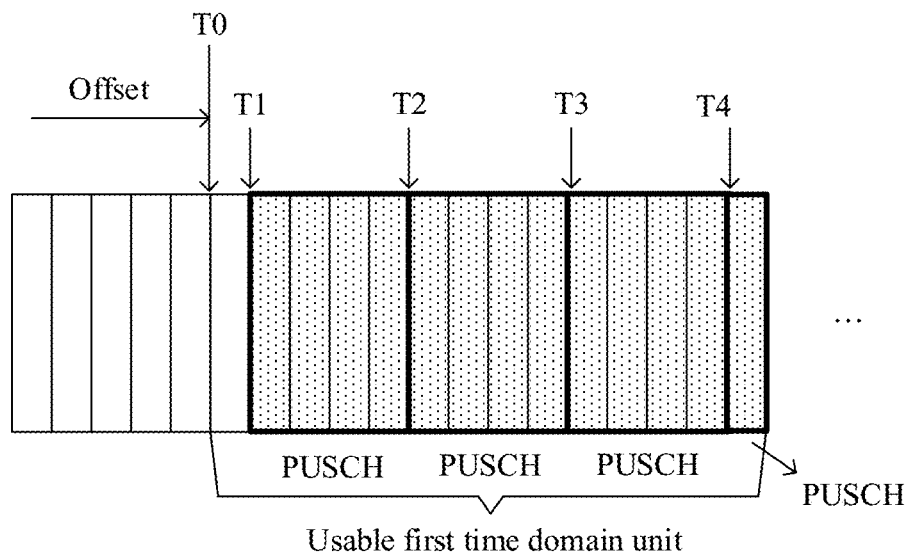
FIG. 7 is a fourth schematic diagram of mapping a channel to a time domain resource according to an embodiment of this disclosure.

For example, in a case that the first numerical value is a valid numerical value and the length of the usable first time domain units is less than or equal to the period length, assuming that the first start position is denoted by S, the first quantity is denoted by L, the number of second mapping sub-resources is denoted by K, and the length of the usable first time domain units is denoted by F, a start time for mapping at least one channel to the usable first time domain unit is [S,S+L−1], [S+L,S+2L−1], . . . , [S+K*L,S+(K+1)*L−1], [S+(K+1)*L,F], where $K=\mathrm{floor}\{(F-S)/L\}.$ As shown in FIG. 7, assuming that the start position of the usable first time domain units is T0, the length of the usable first time domain units F is 14, the first start position S is 1, and the first quantity L is 4, the number of second mapping sub-resources may be:

$K=\mathrm{floor}\{(F-S)/L\}=\mathrm{floor}\{(14-1)/4\}=3.$

Because the first start position S is 1, the position T1 of the usable first time domain unit may be a start position for mapping the 1st channel. Four consecutive second time domain units starting from the position T1 of the usable first time domain unit may be the 1st second mapping sub-resource of the usable first time domain unit, and the 1st second mapping sub-resource may be used for mapping the 1st PUSCH. Four consecutive second time domain units starting from the position T2 of the usable first time domain unit may be the 2nd second mapping sub-resource of the usable first time domain unit, and the 2nd second mapping sub-resource may be used for mapping the 2nd PUSCH. Four consecutive second time domain units starting from the position T3 of the usable first time domain unit may be the 3rd second mapping sub-resource of the usable first time domain unit, and the 3rd second mapping sub-resource may be used for mapping the 3rd PUSCH. The last second time domain unit starting from the position T4 of the usable first time domain unit may be the third mapping sub-resource of the usable first time domain unit, and the third mapping sub-resource may be used for mapping the 4th PUSCH.

(c) The third resource may be P consecutive second time domain units from the first start position. P may be the first difference, and P is a positive integer.

For example, in the case that the first numerical value is a valid numerical value and the length of the usable first time domain units is less than or equal to the period length, assuming that the first start position is denoted by S and the length of the usable first time domain units is denoted by F, the start time for mapping one channel to the usable first time domain unit may be [S,F].

Figure 8:
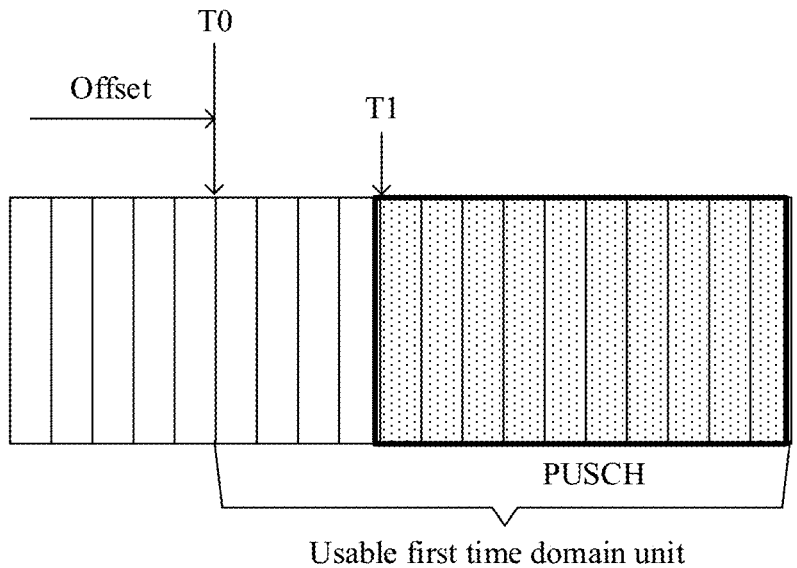
FIG. 8 is a fifth schematic diagram of mapping a channel to a time domain resource according to an embodiment of this disclosure.

As shown in FIG. 8, assuming that the start position of the usable first time domain units is T0, the length of the usable first time domain units F is 14, and the first start position S is 4, the first difference is P=F−S=10. Because the first start position S is 4, the position T1 of the usable first time domain unit may be a start position for channel mapping. 10 consecutive second time domain units starting from the position T1 of the usable first time domain unit (that is, from the position T1 of the usable first time domain unit to an end position of the usable first time domain unit) may be the third resource, and the third resource may be used for mapping one PUSCH.

(d) The fourth resource may be Q consecutive second mapping sub-resources starting from the start position of the usable first time domain units. Q may be a value obtained by rounding down a ratio of the length of the usable first time domain units to the first quantity, and Q is a positive integer.

Figure 9:
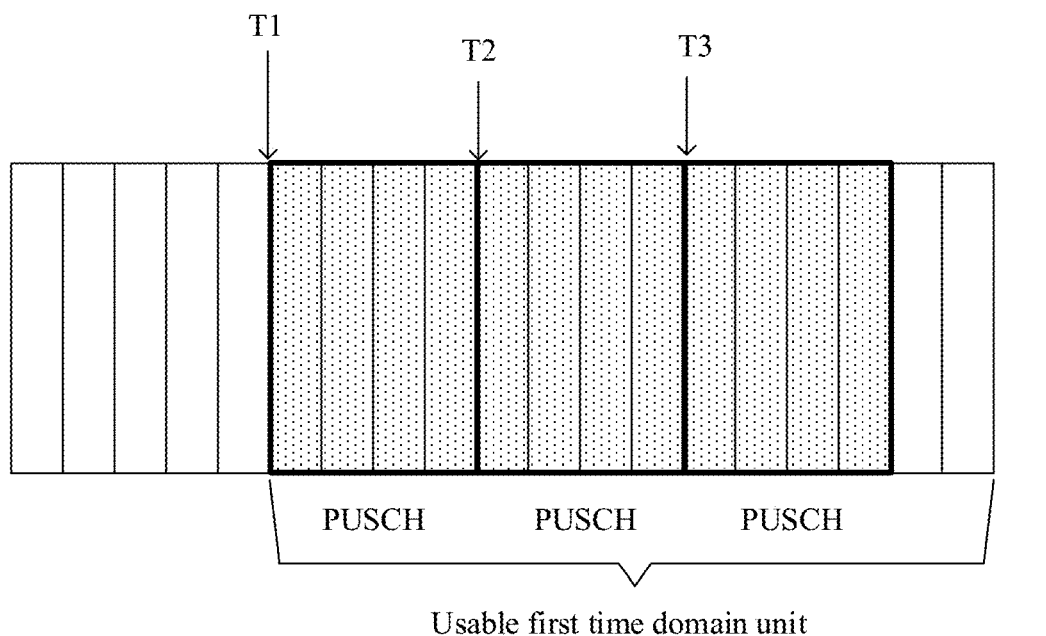
FIG. 9 is a sixth schematic diagram of mapping a channel to a time domain resource according to an embodiment of this disclosure.

For example, as shown in FIG. 9, assuming that the start position of the usable first time domain units is T1, the length of the usable first time domain units F is 14, the first start position S is 0, and the first quantity L is 4, the number of second mapping sub-resources may be:

$Q=\mathrm{floor}\{F/L\}=\mathrm{floor}\{14/4\}=3.$

As shown in FIG. 9, because the first start position S is 0, the start position T1 of the usable first time domain unit may be a start position for mapping the 1st channel. Four consecutive second time domain units starting from the start position T1 of the usable first time domain unit may be the 1st second mapping sub-resource of the usable first time domain unit, and the 1st second mapping sub-resource may be used for mapping the 1st PUSCH. Four consecutive second time domain units starting from the position T2 of the usable first time domain unit may be the 2nd second mapping sub-resource of the usable first time domain unit, and the 2nd second mapping sub-resource may be used for mapping the 2nd PUSCH. Four consecutive second time domain units starting from the position T3 of the usable first time domain unit may be the 3rd second mapping sub-resource of the usable first time domain unit, and the 3rd second mapping sub-resource may be used for mapping the 3rd PUSCH.

(e) The fifth resource may be all second time domain units in the usable first time domain unit.

Figure 10:
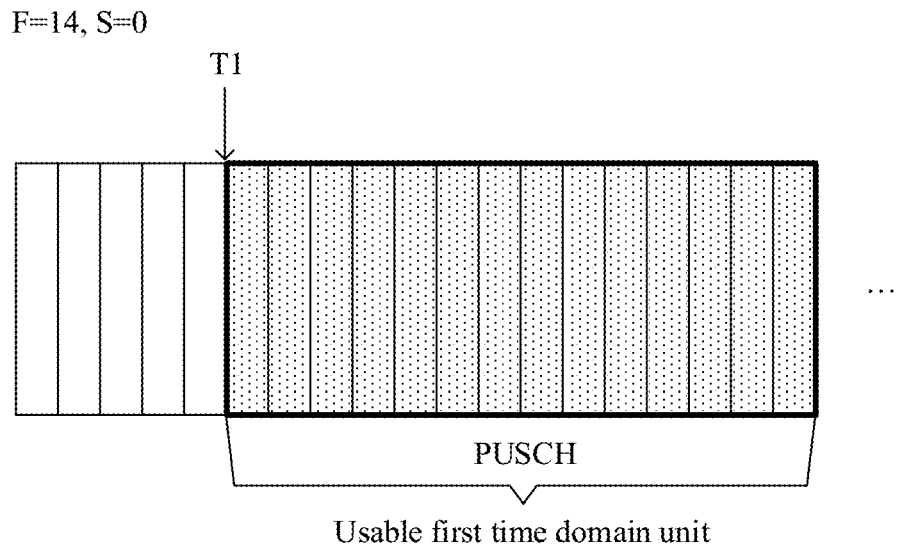
FIG. 10 is a seventh schematic diagram of mapping a channel to a time domain resource according to an embodiment of this disclosure.

For example, as shown in FIG. 10, it is assumed that the start position of the usable first time domain units is T1, and the length of the usable first time domain units F is 14. 14 consecutive second time domain units starting from the start position T1 of the usable first time domain unit (that is, all second time domain units in the usable first time domain unit) may be the fifth resource, and the fifth resource may be used for mapping one PUSCH.

(f) The sixth resource may be R consecutive second time domain units starting from the start position of the usable first time domain units. R is the first quantity, and R is a positive integer.

For example, in the case that the first numerical value is a valid numerical value and the length of the usable first time domain units is less than or equal to the period length, assuming that the first start position is denoted by S, the length of the usable first time domain units is denoted by F, and the first quantity is denoted by L, the start time for mapping one channel to the usable first time domain unit may be [0,L].

Figure 11:
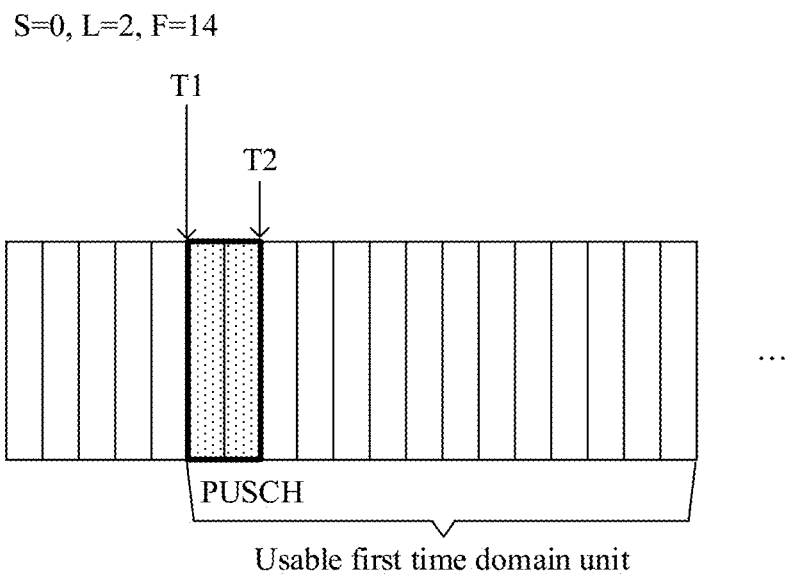
FIG. 11 is an eighth schematic diagram of mapping a channel to a time domain resource according to an embodiment of this disclosure.

As shown in FIG. 11, an example in which the length of the usable first time domain units F is 14, the first start position S is 0, and the first quantity L is 2 is used for exemplary description. Two consecutive second time domain units starting from the start position T1 of the usable first time domain unit may be a sixth resource, and the sixth resource may be used for mapping one PUSCH.

Step 202A7: The UE maps the target channel to the first time domain resource.

According to the resource mapping method provided in this embodiment of this disclosure, in the case that the first numerical value is a valid numerical value and the length of the usable first time domain units may be less than or equal to the period length, each period may include M usable first time domain units, and a manner of channel mapping for each usable first time domain unit is different, thereby improving flexibility in configuration of time domain resources.

For clearer understanding of the resource mapping method provided by this embodiment of disclosure, the following provides several examples of mapping the target channel to the first time domain resource in the target manner.

Example 1

The following example is used for exemplary description: A mapping resource of each usable first time domain unit in the M usable first time domain units is a first target resource (that is, the target manner is the first manner), and the first target resource is the first resource (that is, K consecutive second mapping sub-resources starting from the first start position).

Figure 12:
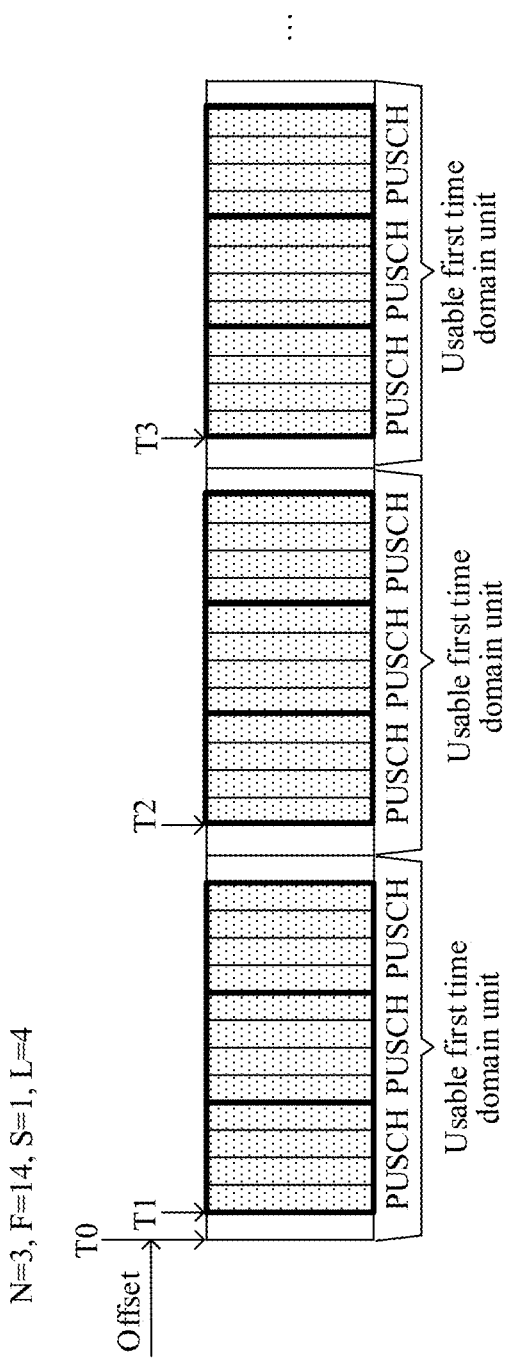
FIG. 12 is a ninth schematic diagram of mapping a channel to a time domain resource according to an embodiment of this disclosure.

For example, as shown in FIG. 12, it is assumed that N=3, F=14, S=1, and L=4, that is, each period includes three usable first time domain units, the length of each usable first time domain unit F is 14, and the number (the first quantity) of second time domain units occupied by one channel in each usable first time domain unit is 4.

The number of second mapping sub-resources in each usable first time domain unit may be:

$$K=\text{floor}\{(F-S)/L\}=\text{floor}\{(14-1)/4\}=3.$$

For the 1st usable first time domain unit, the position T1 may be a start position for mapping the 1st channel in the 1st usable first time domain unit. Four consecutive second time domain units starting from the position T1 may be the 1st second mapping sub-resource of the 1st usable first time domain unit, and the 1st second mapping sub-resource may be used for mapping the 1st PUSCH in the 1st usable first time domain unit. Four consecutive second time domain units after the 1st second mapping sub-resource may be the 2nd second mapping sub-resource of the 1st usable first time domain unit, and the 2nd second mapping sub-resource may be used for mapping the 2nd PUSCH in the 1st usable first time domain unit. Four consecutive second time domain units after the 2nd second mapping sub-resource may be the 3rd second mapping sub-resource of the 1st usable first time domain unit, and the 3rd second mapping sub-resource may be used for mapping the 3rd PUSCH in the 1st usable first time domain unit.

For the 2nd usable first time domain unit, the position T2 may be a start position for mapping the 1st channel in the 2nd usable first time domain unit. Four consecutive second time domain units starting from the position T2 may be the 1st second mapping sub-resource of the 2nd usable first time domain unit, and the 1st second mapping sub-resource may be used for mapping the 1st PUSCH in the 2nd usable first time domain unit. Four consecutive second time domain units after the 1st second mapping sub-resource may be the 2nd second mapping sub-resource of the 2nd usable first time domain unit, and the 2nd second mapping sub-resource may be used for mapping the 2nd PUSCH in the 2nd usable first time domain unit. Four consecutive second time domain units after the 2nd second mapping sub-resource may be the 3rd second mapping sub-resource of the 2nd usable first time domain unit, and the 3rd second mapping sub-resource may be used for mapping the 3rd PUSCH in the 2nd usable first time domain unit.

For the 3rd usable first time domain unit, the position T3 may be a start position for mapping the 1st channel in the 3rd usable first time domain unit. Four consecutive second time domain units starting from the position T3 may be the 1st second mapping sub-resource of the 3rd usable first time domain unit, and the 1st second mapping sub-resource may be used for mapping the 1st PUSCH in the 3rd usable first time domain unit. Four consecutive second time domain units after the 1st second mapping sub-resource may be the 2nd second mapping sub-resource of the 3rd usable first time domain unit, and the 2nd second mapping sub-resource may be used for mapping the 2nd PUSCH in the 3rd usable first time domain unit. Four consecutive second time domain units after the 2nd second mapping sub-resource may be the 3rd second mapping sub-resource of the 3rd usable first time domain unit, and the 3rd second mapping sub-resource may be used for mapping the 3rd PUSCH in the 3rd usable first time domain unit.

Example 2

The following example is used for exemplary description: A mapping resource of the 1st usable first time domain unit in the M usable first time domain units is a first target resource, and mapping resources of other usable first time domain units in the M usable first time domain units are second target resources (that is, the target manner is the second manner); and the first target resource is the first resource (that is, K consecutive second mapping sub-resources starting from the first start position), and the second target resource is the fourth resource (Q consecutive second mapping sub-resources starting from the start position of the usable first time domain units).

Figure 13:
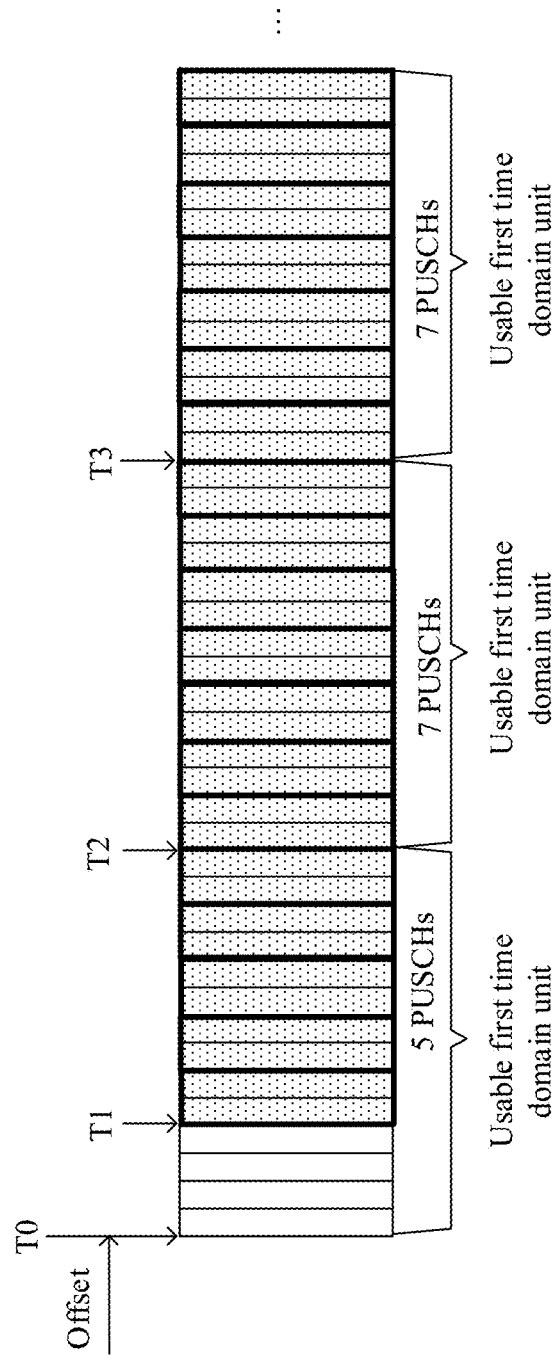
FIG. 13 is a tenth schematic diagram of mapping a channel to a time domain resource according to an embodiment of this disclosure.

For example, as shown in FIG. 13, it is assumed that N=3, F=14, S=4, and L=2, that is, each period includes three usable first time domain units, the length of each usable first time domain unit F is 14, and the number (the first quantity) of second time domain units occupied by one channel in the usable first time domain unit is 2.

The number of second mapping sub-resources in the 1st usable first time domain unit may be:

$$K1=\text{floor}\{(F-S)/L\}=\text{floor}\{(14-4)/2\}=5.$$

The number of second mapping sub-resources in the 2nd usable first time domain unit and the 3rd usable first time domain unit may be:

$$K2=\text{floor}\{F/L\}=\text{floor}\{14/2\}=7.$$

For the 1st usable first time domain unit, the position T1 may be a start position for mapping the 1st channel in the 1st usable first time domain unit. Two consecutive second time domain units starting from the position T1 may be the 1st second mapping sub-resource of the 1st usable first time domain unit, and the 1st second mapping sub-resource may be used for mapping the 1st PUSCH in the 1st usable first time domain unit. Two consecutive second time domain units after the 1st second mapping sub-resource may be the 2nd second mapping sub-resource of the 1st usable first time domain unit, and the 2nd second mapping sub-resource may be used for mapping the 2nd PUSCH in the 1st usable first time domain unit; . . . ; and so on. The last two second mapping sub-resources of the 1st usable first time domain unit may be the 5th second mapping sub-resource of the 1st usable first time domain unit, and the 5th second mapping sub-resource may be used for mapping the 5th PUSCH in the 1st usable first time domain unit.

For the 2nd usable first time domain unit, the position T2 may be a start position for mapping the 1st channel in the 2nd usable first time domain unit. Two consecutive second time domain units starting from the position T2 may be the 1st second mapping sub-resource of the 2nd usable first time domain unit, and the 1st second mapping sub-resource may be used for mapping the 1st PUSCH in the 2nd usable first time domain unit. Two consecutive second time domain units after the 1st second mapping sub-resource may be the 2nd second mapping sub-resource of the 2nd usable first time domain unit, and the 2nd second mapping sub-resource may be used for mapping the 2nd PUSCH in the 2nd usable first time domain unit; . . . ; and so on. The last two second mapping sub-resources of the 2nd usable first time domain unit may be the 7th second mapping sub-resource of the 2nd usable first time domain unit, and the 7th second mapping sub-resource may be used for mapping the 7th PUSCH in the 2nd usable first time domain unit.

For the 3rd usable first time domain unit, the position T3 may be a start position for mapping the 1st channel in the 3rd usable first time domain unit. Two consecutive second time domain units starting from the position T3 may be the 1st second mapping sub-resource of the 3rd usable first time domain unit, and the 1st second mapping sub-resource may be used for mapping the 1st PUSCH in the 3rd usable first time domain unit. Two consecutive second time domain units after the 1st second mapping sub-resource may be the 2nd second mapping sub-resource of the 3rd usable first time domain unit, and the 2nd second mapping sub-resource may be used for mapping the 2nd PUSCH in the 3rd usable first time domain unit; . . . ; and so on. The last two second mapping sub-resources of the 3rd usable first time domain unit may be the 7th second mapping sub-resource of the 3rd usable first time domain unit, and the 7th second mapping sub-resource may be used for mapping the 7th PUSCH in the 3rd usable first time domain unit.

Example 3

The following example is used for exemplary description: A mapping resource of each usable first time domain unit in the M usable first time domain units is a first target resource (that is, the target manner is the first manner), and the first target resource is the second resource (that is, K consecutive second mapping sub-resources starting from the first start position and one third mapping sub-resource).

Figure 14:
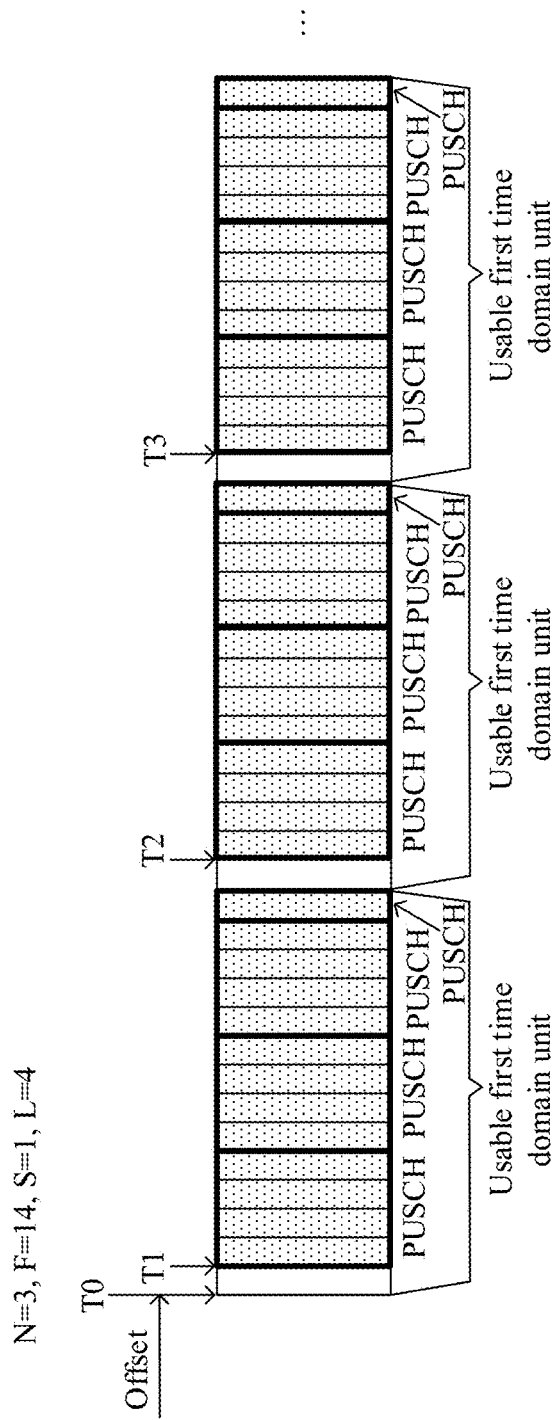
FIG. 14 is an eleventh schematic diagram of mapping a channel to a time domain resource according to an embodiment of this disclosure.

For example, as shown in FIG. 14, it is assumed that N=3, F=14, S=1, and L=4, that is, each period includes three usable first time domain units, the length of each usable first time domain unit F is 14, and the number (the first quantity) of second time domain units occupied by one channel in the usable first time domain unit is 4.

The number of second mapping sub-resources in each usable first time domain unit may be:

$K=\text{floor}\{(F-S)/L\}=\text{floor}\{(14-1)/4\}=3$.

For the 1st usable first time domain unit, the position T1 may be a start position for mapping the 1st channel in the 1st usable first time domain unit. Four consecutive second time domain units starting from the position T1 may be the 1st second mapping sub-resource of the 1st usable first time domain unit, and the 1st second mapping sub-resource may be used for mapping the 1st PUSCH in the 1st usable first time domain unit. Four consecutive second time domain units after the 1st second mapping sub-resource may be the 2nd second mapping sub-resource of the 1st usable first time domain unit, and the 2nd second mapping sub-resource may be used for mapping the 2nd PUSCH in the 1st usable first time domain unit. Four consecutive second time domain units after the 2nd second mapping sub-resource may be the 3rd second mapping sub-resource of the 1st usable first time domain unit, and the 3rd second mapping sub-resource may be used for mapping the 3rd PUSCH in the 1st usable first time domain unit. The last one second time domain unit of the 1st usable first time domain unit may be the third mapping sub-resource of the 1st usable first time domain unit, and the third mapping sub-resource may be used for mapping the 4th PUSCH in the 1st usable first time domain unit.

For the 2nd usable first time domain unit, the position T2 may be a start position for mapping the 1st channel in the 2nd usable first time domain unit. Four consecutive second time domain units starting from the position T2 may be the 1st second mapping sub-resource of the 2nd usable first time domain unit, and the 1st second mapping sub-resource may be used for mapping the 1st PUSCH in the 2nd usable first time domain unit. Four consecutive second time domain units after the 1st second mapping sub-resource may be the 2nd second mapping sub-resource of the 2nd usable first time domain unit, and the 2nd second mapping sub-resource may be used for mapping the 2nd PUSCH in the 2nd usable first time domain unit. Four consecutive second time domain units after the 2nd second mapping sub-resource may be the 3rd second mapping sub-resource of the 2nd usable first time domain unit, and the 3rd second mapping sub-resource may be used for mapping the 3rd PUSCH in the 2nd usable first time domain unit. The last one second time domain unit of the 2nd usable first time domain unit may be the third mapping sub-resource of the 2nd usable first time domain unit, and the third mapping sub-resource may be used for mapping the 4th PUSCH in the 2nd usable first time domain unit.

For the 3rd usable first time domain unit, the position T3 may be a start position for mapping the 1st channel in the 3rd usable first time domain unit. Four consecutive second time domain units starting from the position T3 may be the 1st second mapping sub-resource of the 3rd usable first time domain unit, and the 1st second mapping sub-resource may be used for mapping the 1st PUSCH in the 3rd usable first time domain unit. Four consecutive second time domain units after the 1st second mapping sub-resource may be the 2nd second mapping sub-resource of the 3rd usable first time domain unit, and the 2nd second mapping sub-resource may be used for mapping the 2nd PUSCH in the 3rd usable first time domain unit. Four consecutive second time domain units after the 2nd second mapping sub-resource may be the 3rd second mapping sub-resource of the 3rd usable first time domain unit, and the 3rd second mapping sub-resource may be used for mapping the 3rd PUSCH in the 3rd usable first time domain unit. The last one second time domain unit of the 3rd usable first time domain unit may be the third mapping sub-resource of the 3rd usable first time domain unit, and the third mapping sub-resource may be used for mapping the 4th PUSCH in the 3rd usable first time domain unit.

Example 4

The following example is used for exemplary description: A mapping resource of the 1st usable first time domain unit in the M usable first time domain units is a first target resource, a mapping resource of the last usable first time domain unit in the M usable first time domain units is a third target resource, and mapping resources of other usable first time domain units in the M usable first time domain units are second target resources (that is, the target manner is the third manner); and the first target resource is the third resource (P consecutive second time domain units starting from the first start position), the second target resource is the fifth resource (all second time domain units in the usable first time domain unit), and the third target resource is the sixth resource (R consecutive second time domain units starting from the start position of the usable first time domain units).

Figure 15:
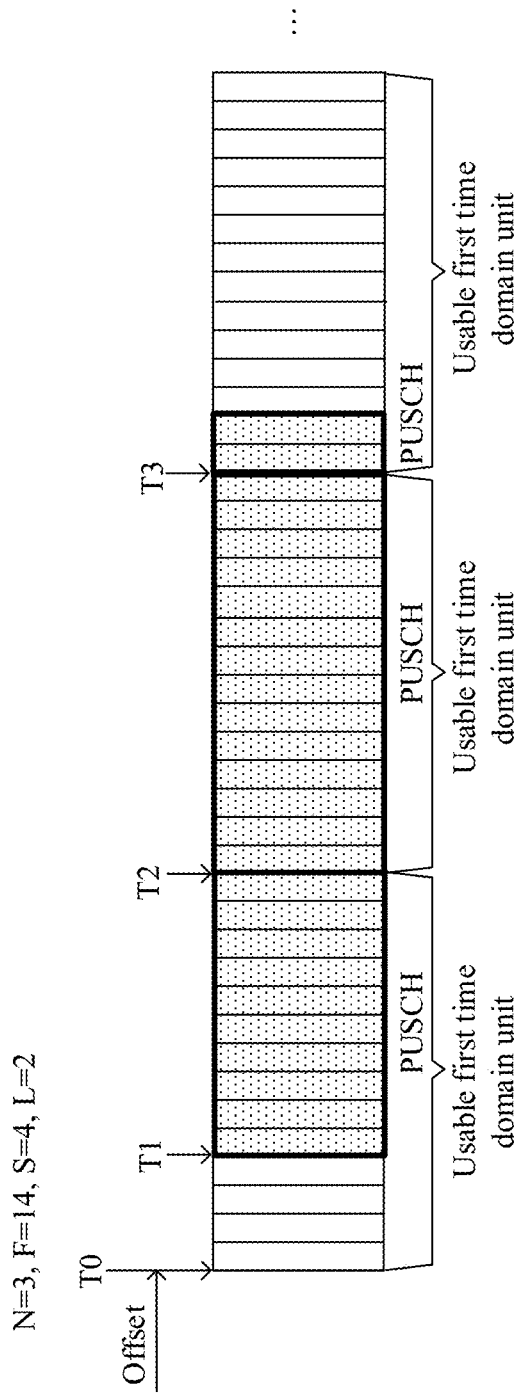
FIG. 15 is a twelfth schematic diagram of mapping a channel to a time domain resource according to an embodiment of this disclosure.

For example, as shown in FIG. 15, it is assumed that N=3, F=14, S=4, and L=2, that is, each period includes three usable first time domain units, the length of each usable first time domain unit F is 14, and the number (the first quantity) of second time domain units occupied by one channel in the 3rd usable first time domain unit is 2.

For the 1st usable first time domain unit, the position T1 may be a start position for mapping one channel in the 1st usable first time domain unit. 10 consecutive second time domain units starting from the position T1 may be used for mapping one PUSCH in the 1st usable first time domain unit.

For the 2nd usable first time domain unit, the position T2 may be a start position for mapping one channel in the 2nd usable first time domain unit. 14 consecutive second time domain units starting from the position T2 (all second time domain units in the 2nd usable first time domain unit) may be used for mapping one PUSCH in the 2nd usable first time domain unit.

For the 3rd usable first time domain unit, the position T3 may be a start position for mapping one channel in the 3rd usable first time domain unit. Two consecutive second time domain units starting from the position T3 may be used for mapping one PUSCH in the 3rd usable first time domain unit.

Figure 16:
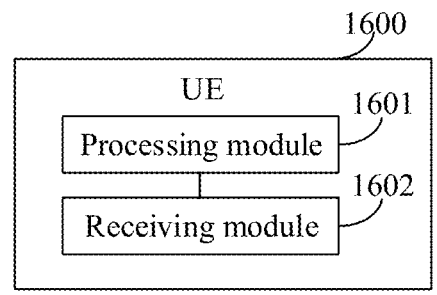
FIG. 16 is a schematic structural diagram of UE according to an embodiment of this disclosure.

As shown in FIG. 16, an embodiment of this disclosure provides UE 1600. The UE may include a processing module 1601. The processing module 1601 may be configured to map a target channel to a first time domain resource based on the configuration information, where the target channel may carry first data, and the configuration information may include a first numerical value. The first numerical value may be used to indicate the number of channels to be mapped to a target time domain resource in each period, or the number of usable first time domain units in each period; the target time domain resource may be a resource configured for the first data; and the first time domain resource may be a resource in the target time domain resource.

Optionally, in this embodiment of this disclosure, the configuration information may further include a period length, a first start position, and a first quantity. The first start position may be a start position mapped with the 1st channel in the 1st period, and the first quantity may be the number of second time domain units occupied by one channel in each period.

Optionally, in this embodiment of this disclosure, the period length may be the length of each period in the target time domain resource.

Optionally, in this embodiment of this disclosure, the configuration information may further include a first offset, and the first offset may be an offset of the target time domain resource.

Optionally, in this embodiment of this disclosure, the processing module 1601 may be specifically configured to map the target channel to the first time domain resource in each period based on the configuration information.

Optionally, in this embodiment of this disclosure, in a case that the first numerical value is an invalid numerical value, the number of channels to be mapped in each period may be 1. The processing module 1601 may be specifically configured to determine the first time domain resource in each period based on the configuration information; and map the target channel to the first time domain resource. The first time domain resource may be L consecutive second time domain units starting from the first start position, L is the first quantity, and L is a positive integer.

Optionally, in this embodiment of this disclosure, in a case that the length of the usable first time domain units is greater than the period length and the first numerical value is a valid numerical value, the number of channels to be mapped in each period is the first numerical value. The processing module 1601 may be specifically configured to determine the first time domain resource in each period based on the configuration information; and map the target channel to the first time domain resource. The first time domain resource may be N consecutive first mapping sub-resources starting from the first start position, the number of second time domain units in each first mapping sub-resource is the first quantity, and N is the first numerical value.

Optionally, in this embodiment of this disclosure, in a case that the length of the usable first time domain units is less than or equal to the period length and the first numerical value is a valid numerical value, the number of usable first time domain units in each period is the first numerical value. The processing module 1601 may be specifically configured to determine M usable first time domain units in each period based on the configuration information, where M is the first numerical value, and M is a positive integer; determine the first time domain resource from the M usable first time domain units based on the configuration information; and map the target channel to the first time domain resource.

Optionally, in this embodiment of this disclosure, the processing module 1601 may be specifically configured to: determine the first time domain resource from the M usable first time domain units based on the configuration information by using a target manner, where the target manner may be a first manner, a second manner, or a third manner. The first manner may be that a mapping resource of each usable first time domain unit in the M usable first time domain units is a first target resource. The second manner may be that a mapping resource of the 1st usable first time domain unit in the M usable first time domain units is a first target resource, and mapping resources of other usable first time domain units in the M usable first time domain units are second target resources. The third manner may be that a mapping resource of the 1st usable first time domain unit in the M usable first time domain units is a first target resource, a mapping resource of the last usable first time domain unit in the M usable first time domain units is a third target resource, and mapping resources of other usable first time domain units in the M usable first time domain units are second target resources. A mapping resource of each usable first time domain unit may form the first time domain resource.

Optionally, in this embodiment of this disclosure, the first start position is a start position for mapping the 1st channel in each usable first time domain unit, and the first quantity is the number of second time domain units occupied by one channel in each usable first time domain unit. The first target resource may be a first resource, a second resource, or a third resource, the second target resource may be a fourth resource or a fifth resource, and the third target resource may be a sixth resource.

The first resource may be K consecutive second mapping sub-resources starting from the first start position. The number of second time domain units in each second mapping sub-resource may be the first quantity, and K may be a value obtained by rounding down a ratio of a first difference to the first quantity. The first difference may be a different between the length of the usable first time domain units and the first start position, and K is a positive integer.

The second resource may be K consecutive second mapping sub-resources starting from the first start position and one third mapping sub-resource. The third mapping sub-resource may be a second time domain unit, other than second time domain unit(s) before the first start position and second time domain unit(s) of the K second mapping sub-resources, in the usable first time domain units.

The third resource may be P consecutive second time domain units from the first start position. P is the first difference, and P is a positive integer.

The fourth resource may be Q consecutive second mapping sub-resources starting from the start position of the usable first time domain units. Q may be a value obtained by rounding down a ratio of the length of the usable first time domain units to the first quantity, and Q is a positive integer.

The fifth resource may be all second time domain units in the usable first time domain unit.

The sixth resource may be R consecutive second time domain units starting from the start position of the usable first time domain units. R may be the first quantity, and R is a positive integer.

Optionally, as shown in FIG. 16, the UE provided in this embodiment of this disclosure may further include a receiving module 1602. The receiving module 1602 may be configured to: before the processing module 1601 maps the target channel to the first time domain resource based on the configuration information, receive the configuration information transmitted by an access network device.

The UE provided in this embodiment of this disclosure is capable of implementing the processes that are implemented by the UE in the resource mapping method embodiment. To avoid repetition, details are not described herein again.

This embodiment of this disclosure provides UE. Because the first numerical value in the configuration information may be used to indicate the number of channels to be mapped in each period or the number of usable first time domain units in each period. Therefore, the number of channels to be mapped in each period or the number of usable first time domain units in each period can be flexibly configured by configuring the first numerical value, so that the UE provided in this embodiment of this disclosure can flexibly configure, based on the configuration information, the first time domain resource for mapping the target channel, thereby improving flexibility in configuration of time domain resources.

Figure 17:
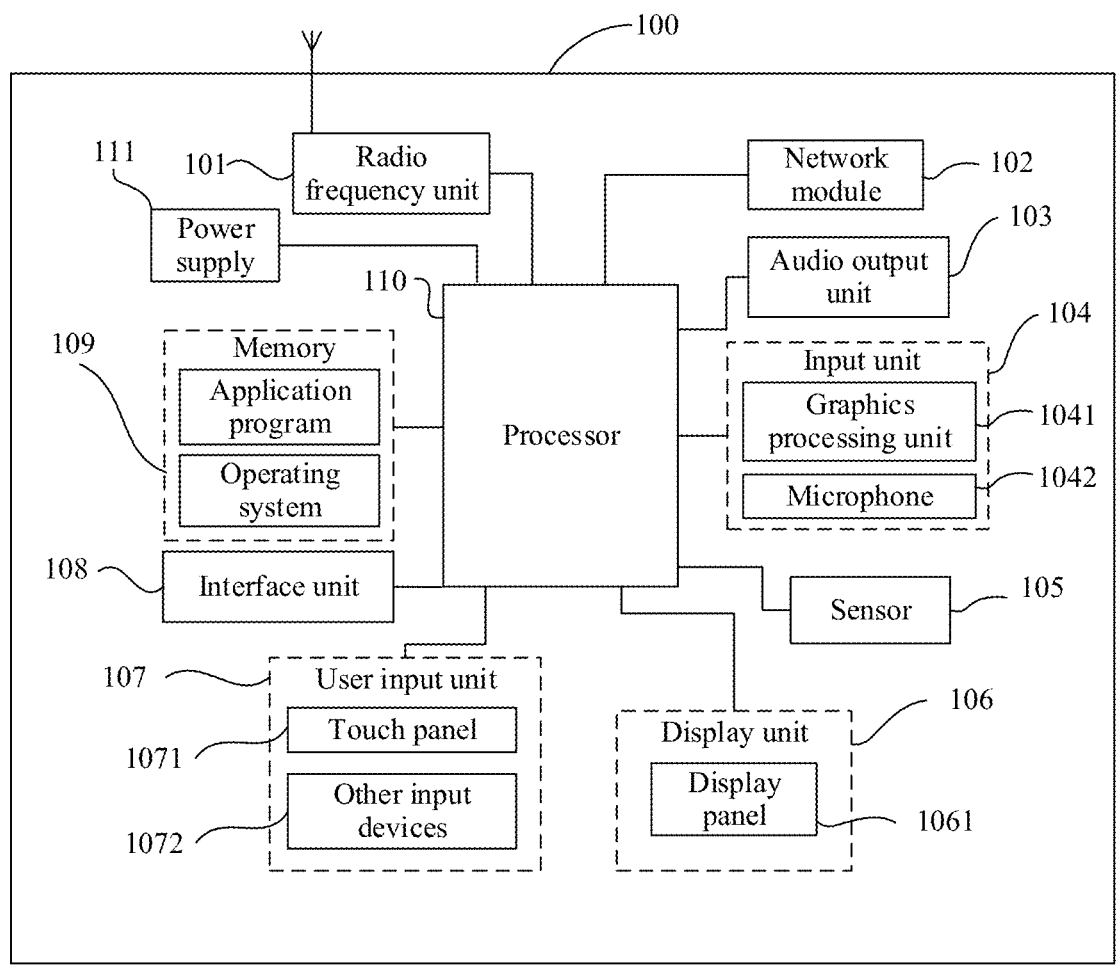
FIG. 17 is a schematic diagram of hardware of UE according to an embodiment of this disclosure.

FIG. 17 is a schematic diagram of a hardware structure of UE for implementing the embodiments of this disclosure. As shown in FIG. 17, the UE 100 shown in FIG. 17 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that a structure of the UE shown in FIG. 17 does not constitute any limitation on the UE, and the UE may include more or fewer components than those shown in the figure, or a combination of some components, or the components disposed differently. In this embodiment of this disclosure, the UE includes but is not limited to a mobile phone, a tablet computer, a laptop computer, a personal digital assistant, a wearable device, a pedometer, and the like.

The processor 110 may be configured to map a target channel to a first time domain resource based on the configuration information, where the target channel carries first data, and the configuration information may include a first numerical value. The first numerical value may be used to indicate the number of channels to be mapped to a target time domain resource in each period, or the number of usable first time domain units in each period; the target time domain resource may be a resource configured for the first data; and the first time domain resource may be a resource in the target time domain resource.

This embodiment of this disclosure provides UE. Because the first numerical value in the configuration information may be used to indicate the number of channels to be mapped in each period or the number of usable first time domain units in each period. Therefore, the number of channels to be mapped in each period or the number of usable first time domain units in each period can be flexibly configured by configuring the first numerical value, so that the UE provided in this embodiment of this disclosure can flexibly configure, based on the configuration information, the first time domain resource for mapping the target channel, thereby improving flexibility in configuration of time domain resources.

It should be understood that in this embodiment of this disclosure, the radio frequency unit 101 may be configured to: receive and transmit signals in an information receiving/sending process or a call process; and specifically, after receiving downlink data from a base station, transmit the downlink information to the processor 110 for processing, and in addition, transmit uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The UE 100 provides the user with wireless broadband Internet access through the network module 102, for example, helping the user to send and receive e-mails, browse web pages, and access streaming media.

The audio output unit 103 may convert audio data received by the radio frequency unit 101 or the network module 102 or stored in the memory 109 into an audio signal, and output the audio signal as a sound. In addition, the audio output unit 103 may further provide audio output (for example, a call signal reception sound or a message reception sound) related to a specific function performed by the UE 100. The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. A processed image frame may be displayed on the display unit 106. An image frame processed by the graphics processing unit 1041 may be stored in the memory 109 (or another storage medium) or transmitted by the radio frequency unit 101 or the network module 102. The microphone 1042 can receive a sound and can process the sound into audio data. The processed audio data may be converted in a telephone call mode into a format that can be transmitted by the radio frequency unit 101 to a mobile communications base station, for outputting.

The UE 100 further includes at least one sensor 105, for example, an optical sensor, a motion sensor, and another sensor. Specifically, the optical sensor may include an ambient light sensor and a proximity sensor. The ambient light sensor may adjust luminance of the display panel 1061 based on brightness of ambient light, and the proximity sensor may turn off the display panel 1061 and/or backlight when the UE 100 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the mobile terminal, functions related to vibration recognition (such as pedometer and tapping), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061, and the display panel 1061 may be configured in a form of a liquid crystal display (LCD), an organic light-emitting diode (OLED), or the like.

The user input unit 107 may be configured to receive input digit or character information, and generate a key signal input related to a user setting and function control of the UE 100. Specifically, the user input unit 107 includes a touch panel 1071 and other input devices 1072. The touch panel 1071, also referred to as a touchscreen, may capture a touch operation performed by the user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 110, and receives and executes a command transmitted by the processor 110. In addition, the touch panel 1071 may be implemented in a plurality of forms, for example, a resistive, capacitive, infrared, or surface acoustic wave touch panel. The user input unit 107 may further include the other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. Although in FIG. 17, the touch panel 1071 and the display panel 1061 act as two independent parts to implement input and output functions of the UE, in some embodiments, the touch panel 1071 and the display panel 1061 may be integrated to implement the input and output functions of the UE. This is not specifically limited herein.

The interface unit 108 is an interface between an external apparatus and the UE 100. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 108 may be configured to receive an input (for example, data information or power) from an external apparatus and transmit the received input to one or more elements within the UE 100, or may be configured to transmit data between the UE 100 and the external apparatus.

The memory 109 may be configured to store software programs and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, and may further include a non-volatile memory such as a disk storage device, a flash memory device, or another volatile solid-state storage device.

The processor 110 is a control center of the UE. The processor 109 uses various interfaces and lines to connect all parts of the entire UE, and performs various functions and data processing of the UE by running or executing the software program and/or module stored in the memory 109 and invoking data stored in the memory 1009, thereby performing overall monitoring on the UE. The processor 110 may include one or more processing units. Optionally, an application processor and a modem processor may be integrated in the processor 110. The application processor primarily processes an operating system, user interfaces, application programs, and the like. The modem processor primarily processes radio communication. It can be understood that the modem processor may alternatively be not integrated in the processor 110.

The UE 100 may further include the power supply 111 (for example, a battery) supplying power to all components. Optionally, the power supply 111 may be logically connected to the processor 110 through a power management system. In this way, functions such as charge management, discharge management, and power consumption management are implemented by using the power management system.

In addition, the UE 100 includes some functional modules that are not shown. Details are not described herein.

Optionally, an embodiment of this disclosure further provides UE. As shown in FIG. 17, the UE includes a processor 110, a memory 109, and a computer program stored in the memory 109 and running on the processor 110. When the computer program is executed by the processor 110, the processes of the foregoing embodiment of the resource mapping method can be implemented, with same technical effects achieved. To avoid repetition, details are not described herein again. An embodiment of this disclosure further provides a computer-readable storage medium, where a computer program is stored in the computer-readable storage medium. When the computer program is executed by a processor 110 shown in FIG. 17, the processes of the foregoing embodiment of the resource mapping method can be implemented, with same technical effects achieved. To avoid repetition, details are not described herein again. The computer-readable storage medium is, for example, a read-only memory (ROM for short), a random access memory (RAM for short), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially, or the part contributing to the related art, may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A resource mapping method, applied to user equipment (UE), wherein the method comprises:
mapping a target channel to a first time domain resource based on configuration information, wherein the target channel carries first data, and the configuration information comprises a first numerical value; and
the first numerical value is used to indicate the number of channels to be mapped to a target time domain resource in each period, or the number of usable first time domain units in each period; the target time domain resource is a resource configured for the first data; and
the first time domain resource is a resource in the target time domain resource;
wherein the configuration information further comprises a period length, a first start position, and a first quantity; and
the first start position is a start position mapped with the 1st channel in the 1st period, and the first quantity is the number of second time domain units occupied by one channel in each period;
the mapping a target channel to a first time domain resource based on configuration information comprises:
mapping the target channel to the first time domain resource in each period based on the configuration information;
wherein the method further comprises:
determining a first target resource from M usable first time domain units based on the configuration information, wherein a mapping resource of each usable first time domain unit in the M usable first time domain units is the first target resource;
mapping the target channel to the first target resource;
wherein M is the first numerical value, the first target resource comprises K consecutive second mapping sub-resources starting from the first start position, the number of second time domain units in each second mapping sub-resource is the first quantity.

2. The method according to claim 1, wherein the configuration information further comprises a first offset, and the first offset is an offset of the target time domain resource.

3. The method according to claim 1, wherein a length of the usable first time domain units is less than or equal to the period length, and in a case that the first numerical value is a valid numerical value, the number of usable first time domain units in each period is the first numerical value; and
the mapping the target channel to the first time domain resource in each period based on the configuration information comprises:
determining M usable first time domain units in each period based on the configuration information, wherein M is the first numerical value, and M is a positive integer;
determining the first time domain resource from the M usable first time domain units based on the configuration information; and
mapping the target channel to the first time domain resource.

4. The method according to claim 3, wherein the determining the first time domain resource from the M usable first time domain units based on the configuration information comprises:
determining the first time domain resource from the M usable first time domain units based on the configuration information by using a target manner, wherein the target manner is a first manner, a second manner, or a third manner; and
the first manner is that a mapping resource of each usable first time domain unit in the M usable first time domain units is a first target resource;
the second manner is that a mapping resource of the 1st usable first time domain unit in the M usable first time domain units is a first target resource, and mapping resources of other usable first time domain units in the M usable first time domain units are second target resources;
the third manner is that a mapping resource of the 1st usable first time domain unit in the M usable first time domain units is a first target resource, a mapping resource of the last usable first time domain unit in the M usable first time domain units is a third target resource, and mapping resources of other usable first time domain units in the M usable first time domain units are second target resources; and
mapping resources of all usable first time domain units form the first time domain resource.

5. The method according to claim 4, wherein the first target resource is a first resource or a second resource; and
the first resource is K consecutive second mapping sub-resources starting from the first start position, the number of second time domain units in each second mapping sub-resource is the first quantity, and K is a positive integer;
the second resource is K consecutive second mapping sub-resources starting from the first start position and one third mapping sub-resource, and the third mapping sub-resource is a second time domain unit, other than second time domain unit(s) before the first start position and second time domain unit(s) of the K second mapping sub-resources, in the usable first time domain units.

6. The method according to claim 1, wherein before the mapping a target channel to a first time domain resource based on configuration information, the method further comprises:
receiving the configuration information transmitted by an access network device.

7. User equipment (UE), comprising a processor, a memory, and a computer program stored in the memory and capable of running on the processor, wherein the computer program is executed by the processor to implement:
mapping a target channel to a first time domain resource based on configuration information, wherein the target channel carries first data, and the configuration information comprises a first numerical value; and
the first numerical value is used to indicate the number of channels to be mapped to a target time domain resource in each period, or the number of usable first time domain units in each period; the target time domain resource is a resource configured for the first data; and
the first time domain resource is a resource in the target time domain resource;
wherein the configuration information further comprises a period length, a first start position, and a first quantity; and
the first start position is a start position mapped with the 1st channel in the 1st period, and the first quantity is the number of second time domain units occupied by one channel in each period;
wherein the mapping a target channel to a first time domain resource based on configuration information comprises:
mapping the target channel to the first time domain resource in each period based on the configuration information;
wherein the computer program is executed by the processor to implement:
determining a first target resource from M usable first time domain units based on the configuration information, wherein a mapping resource of each usable first time domain unit in the M usable first time domain units is the first target resource;
mapping the target channel to the first target resource;
wherein M is the first numerical value, the first target resource comprises K consecutive second mapping sub-resources starting from the first start position, the number of second time domain units in each second mapping sub-resource is the first quantity.

8. The UE according to claim 7, wherein the configuration information further comprises a first offset, and the first offset is an offset of the target time domain resource.

9. The UE according to claim 7, wherein a length of the usable first time domain units is less than or equal to the period length, and in a case that the first numerical value is a valid numerical value, the number of usable first time domain units in each period is the first numerical value; and
the mapping the target channel to the first time domain resource in each period based on the configuration information comprises:
determining M usable first time domain units in each period based on the configuration information, wherein M is the first numerical value, and M is a positive integer;
determining the first time domain resource from the M usable first time domain units based on the configuration information; and
mapping the target channel to the first time domain resource.

10. The UE according to claim 9, wherein the determining the first time domain resource from the M usable first time domain units based on the configuration information comprises:
determining the first time domain resource from the M usable first time domain units based on the configuration information by using a target manner, wherein the target manner is a first manner, a second manner, or a third manner; and
the first manner is that a mapping resource of each usable first time domain unit in the M usable first time domain units is a first target resource;
the second manner is that a mapping resource of the 1st usable first time domain unit in the M usable first time domain units is a first target resource, and mapping resources of other usable first time domain units in the M usable first time domain units are second target resources;
the third manner is that a mapping resource of the 1st usable first time domain unit in the M usable first time domain units is a first target resource, a mapping resource of the last usable first time domain unit in the M usable first time domain units is a third target resource, and mapping resources of other usable first time domain units in the M usable first time domain units are second target resources; and
mapping resources of all usable first time domain units form the first time domain resource.

11. The UE according to claim 10, wherein the first target resource is a first resource or a second resource; and
the first resource is K consecutive second mapping sub-resources starting from the first start position, the number of second time domain units in each second mapping sub-resource is the first quantity, and K is a positive integer;
the second resource is K consecutive second mapping sub-resources starting from the first start position and one third mapping sub-resource, and the third mapping sub-resource is a second time domain unit, other than second time domain unit(s) before the first start position and second time domain unit(s) of the K second mapping sub-resources, in the usable first time domain units.

12. The UE according to claim 7, wherein before the mapping a target channel to a first time domain resource based on configuration information, the computer program is executed by the processor to implement:
receiving the configuration information transmitted by an access network device.

13. A non-transitory computer-readable storage medium, wherein the non-transitory computer-readable storage medium stores a computer program, and the computer program is executed by a processor to implement:
- mapping a target channel to a first time domain resource based on configuration information, wherein the target channel carries first data, and the configuration information comprises a first numerical value; and
- the first numerical value is used to indicate the number of channels to be mapped to a target time domain resource in each period, or the number of usable first time domain units in each period; the target time domain resource is a resource configured for the first data; and the first time domain resource is a resource in the target time domain resource;
- wherein the configuration information further comprises a period length, a first start position, and a first quantity; and
- the first start position is a start position mapped with the 1st channel in the 1st period, and the first quantity is the number of second time domain units occupied by one channel in each period;
- wherein the mapping a target channel to a first time domain resource based on configuration information comprises:
- mapping the target channel to the first time domain resource in each period based on the configuration information;
- wherein the computer program is executed by the processor to implement:
- determining a first target resource from M usable first time domain units based on the configuration information, wherein a mapping resource of each usable first time domain unit in the M usable first time domain units is the first target resource;
- mapping the target channel to the first target resource;
- wherein M is the first numerical value, the first target resource comprises K consecutive second mapping sub-resources starting from the first start position, the number of second time domain units in each second mapping sub-resource is the first quantity.

* * * * *